United States Patent [19]

Corley

[11] Patent Number: 5,270,413
[45] Date of Patent: Dec. 14, 1993

[54] ALIPHATIC CYCLOBUTENE POLYMERIC COMPOSITIONS

[75] Inventor: Larry S. Corley, Houston, Tex.
[73] Assignee: Shell Oil Company, Houston, Tex.
[21] Appl. No.: 980,835
[22] Filed: Nov. 24, 1992
[51] Int. Cl.$^5$ .................. C08F 234/00; C08F 232/08
[52] U.S. Cl. .................................. 526/259; 526/280; 526/261; 526/262; 526/205
[58] Field of Search ............... 526/259, 261, 262, 280, 526/205; 524/83

[56] References Cited

U.S. PATENT DOCUMENTS

| | | | |
|---|---|---|---|
| 4,540,763 | 9/1985 | Kirchhoff | 526/281 |
| 4,645,814 | 2/1987 | Grubbs | 526/256 |
| 4,730,030 | 3/1988 | Hahn | 526/262 |
| 4,927,907 | 5/1990 | Corley | 528/322 |
| 4,973,636 | 11/1990 | Corley | 526/262 |
| 5,053,480 | 10/1991 | Koto | 528/188 |
| 5,086,139 | 2/1992 | Corley | 526/262 |
| 5,147,953 | 9/1992 | Corley | 526/262 |

OTHER PUBLICATIONS

Godt, "Double-Standed Molecules," Angew. Chem. Int. Ed. Engl. 28, pp. 1680-1682 (1989).
Mathias, "Cyclobutene Containing Monomers and Polymers," Polymn. Prepr. 28(1), pp. 43-44 (1987).
Mathias, "Radical Homopolymerization," Polymn. Prepr. 31(2), pp. 715-716 (1990).
Casey, "Cyclobutene Terminated Amides ... ," Ph.D. Dissertation, U. of S. Mississippi (1990).
Bellus, "[4+2]-Cycloadditionen ... ," Helv. Chim. ACTA 56, pp. 3004-3038 (1973).
Bellus, "2,3-Dicyanobutadiene as a Reactive Intermediate ... ," Org. Syn. Coll., vol. 6, pp. 427-431 (1988).

*Primary Examiner*—Joseph L. Schofer
*Assistant Examiner*—Mark Nagumo

[57] ABSTRACT

Copolymeric compositions derived from polydienophilic monomers and aliphatic cyclobutene monomers according to the formula

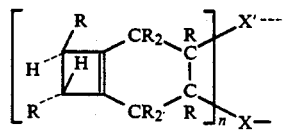

in which each R is independently selected from hydrogen, halide, $C_{1-10}$ alkyl, aryl and $C_{1-10}$ heteroatomic such as alkoxy, aryloxy, alkylthio, arylthio and dialkylamino; X is a divalent linking group; an n is 2.

20 Claims, No Drawings

ALIPHATIC CYCLOBUTENE POLYMERIC COMPOSITIONS

BACKGROUND OF THE INVENTION

This invention relates to thermosettable resin compositions. The invention further relates to the preparation of polymers from a new class of homopolymerizable and copolymerizable monomers. In one aspect, the invention relates to the preparation of low dielectric constant thermosettable resins.

Thermosettable resins are used in applications, such as advanced aerospace composites, requiring good high-temperature properties, including high (above 200° C.) cured glass transition temperature and toughness, as reflected in Mode I fracture toughness values above about 2 MPa-m$^{\frac{1}{2}}$. Examples of thermosettable resins useful in advanced composites include epoxy resins and bismaleimide resins. Epoxy resins have good processing properties but relatively low glass transition temperatures. Bismaleimide resins have superior high-temperature properties but are very brittle. Standard toughening modifiers for bismaleimides, such as diallyl-bisphenol-A, generally do not give fracture toughness values greater than about 1 MPa-m$^{\frac{1}{2}}$ when copolymerized with bismaleimides, and attaining even this degree of toughness often requires the use of so much modifier that the Tg of the cured product is lowered considerably.

Bisbenzocyclobutene monomers can be copolymerized with bismaleimides, as described in U.S. Pat. No. 4,973,636, to provide cured materials having high Tg and high Mode I fracture toughness. However, such bisbenzocyclobutene monomers are quite expensive to prepare, requiring multistep syntheses from the nearest commercially-available material. The cost of the monomer precludes these polymers from practical application in most end-uses.

It is thus an object of the invention to provide new thermoset resin materials. In one aspect, it is an object of the invention to provide polymeric materials having good toughness and low dielectric constant.

SUMMARY OF THE INVENTION

According to the invention, a composition is provided which is the product of copolymerizing a di- or polyfunctional dienophile with at least one monomeric compound of the structural formula:

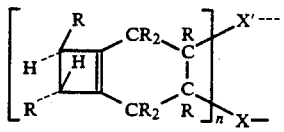

in which each R is independently selected from hydrogen, halide, C$_{1-10}$ alkyl, aryl and C$_{1-10}$ heteroatomic such as alkoxy, aryloxy, alkylthio, arylthio and dialkylamino; X is a divalent linking group; X is selected from the R groups referred to above and divalent linking groups; and n is 2.

Further according to the invention, a method is provided for preparing an aliphatic cyclobutene copolymer, the method comprising (a) providing a mixture of a polydienophilic monomer and an aliphatic cyclobutene monomer of the formula

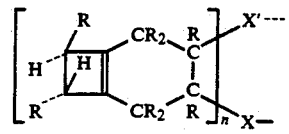

and (b) exposing said monomer mixture to a temperature of at least about 120° C. for a time sufficient to increase the average molecular weight of the constituents of the monomer mixture. To form a fully-cured polymeric composition, the monomeric mixture or a prepolymer thereof is exposed to an elevated temperature for a time sufficient to produce essentially complete reaction of the monomers.

DETAILED DESCRIPTION OF THE INVENTION

The invention is a copolymeric composition derived from one or more bis(aliphatic cyclobutene)-functional monomers which can be described by the following structural formula:

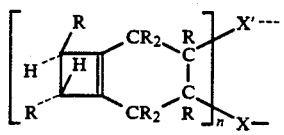

in which each R is independently selected from hydrogen, C$_{1-10}$ alkyl, aryl, halide, and C$_{1-10}$ heteroatomic such as alkoxy, aryloxy, alkylthio, arylthio and dialkylamino; X is a divalent linking group; X' is selected from the R groups referred to above and divalent linking groups; and n is 2. As can be seen from the formula, the cyclobutene groups are not fused to aromatic rings. Monomers in which each R is hydrogen are preferred. Particularly preferred are monomers which themselves can be formally described as Diels-Alder adducts of 1,2-dimethylenecyclobutane with difunctional dienophiles.

The preferred bis(aliphatic cyclobutene)-functional starting monomers for the invention polymers can be prepared by Diels-Alder reaction of 1,2-dimethylenecyclobutane (or a molecule containing this moiety) with a dienophile having at least two dienophilic sites such as a bismaleimide, diacrylate, or 1,4-benzoquinone, for example. Such a process can be illustrated schematically as follows for the reaction of one mole of a bismaleimide (or 1,4-benzoquinone) with two moles of 1,2-dimethylenecyclobutane as follows.

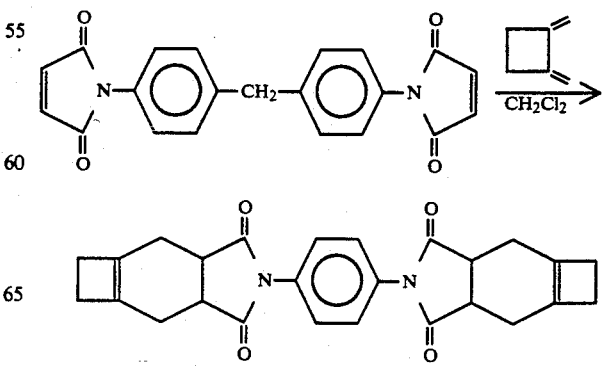

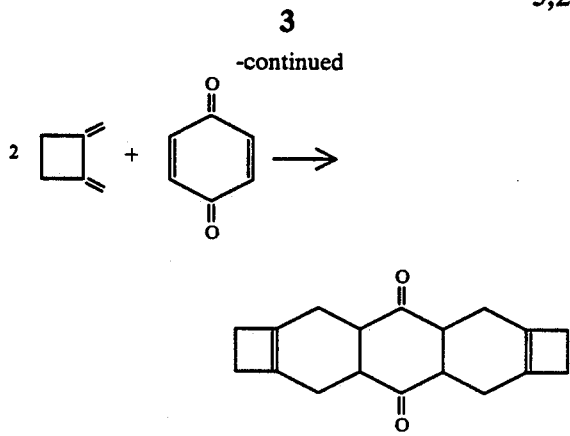

Specific Diels-Alder reaction products are prepared in Examples 2 and 3.

Such a process will generally involve contacting at least about 2 moles of the dimethylenecyclobutane per mole of the bismaleimide (or other dienophile) in an organic diluent such as acetone, dichloromethane, tetrahydrofuran, methyl ethyl ketone, methanol or isopropanol, for example, at a temperature within the range of about 20° C. to about 100° C. A small amount of phenothiazine or other free radical inhibitor/antioxidant (usually less than about 0.1% wt based on the bismaleimide) can be added to the solution. After substantial completion of the reaction, crystalline product can be recovered, washed and recrystallized if greater purity is desired.

Suitable bismaleimides include N,N'-bisimides of unsaturated dicarboxylic acids which can be represented by the formula

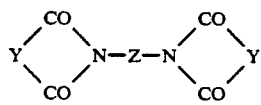

in which Y is a substituted or unsubstituted divalent group containing at least 2 carbon atoms, preferably 2 to 6 carbon atoms, and a carbon-carbon double bond, and Z is a divalent group containing at least 1 and generally about 1 to 40 carbon atoms. Z can be aliphatic, cycloaliphatic, aromatic or heterocyclic. A preferred class of bisimides comprises bismaleimides derived from aromatic amines and can be represented by the formula

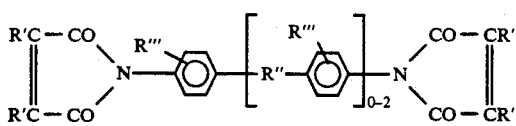

in which each R' is selected independently from H, $C_{1-2}$ alkyl or halide; R" is selected from a direct bond, divalent hydrocarbon radicals containing from about 1 to about 10 carbon atoms, —O—, —$SO_2$—, —COO—, —CONH—, —CO— and —S—; and each R''' is selected independently from H, $C_{1-3}$ alkyl and halide. The aromatic rings may alternatively be heterocyclic.

Examples of such bisimides include
1,2-bismaleimidoethane
1,6-bismaleimidohexane
1,3-bismaleimidobenzene
1,4-bismaleimidobenzene
2,4-bismaleimidotoluene
4,4'-bismaleimidodiphenylmethane
4,4'-bismaleimidodiphenylether
3,3'-bismaleimidodiphenylsulfone
4,4'-bismaleimidodiphenylsulfone
4,4'-bismaleimidodicyclohexylmethane
3,5-bis(4-maleimidophenyl)pyridine
2,6-bismaleimidopyridine
1,3-bis(maleimidomethyl)cyclohexane
1,3-bis(maleimidomethyl)benzene
1,1-bis(4-maleimidophenyl)cyclohexane
1,3-bis(dichloromaleimido)benzene
-4,4'-biscitraconimidodiphenylmethane
2,2-bis(4-maleimidophenyl)propane
1-phenyl-1,1-bis(4-maleimidophenyl)ethane
α,α-bis(4-maleimidophenyl)toluene
3,5-bismaleimido-1,2,4-triazole
and various N,N'-bismaleimides disclosed in U.S. Pat. No. 3,562,223, 4,211,860 and 4,211,861. Bismaleimides can be prepared by methods known in the art, as described in U.S. Pat. No. 3,018,290, for example.

Certain of the starting monomers can be prepared by reaction of at least about 2 moles of an acid halide compound which contains an aliphatic cyclobutene group, such as a bicyclo[4.2.0]oct-1(6)ene-3-carbonyl halide, per mole of a compound having two hydroxyl groups. Suitable dihydroxylic compounds include, for example, resorcinol, bisphenol A, bisphenol F, 4,4'-biphenol and 2,4-hexadiyne-1,6-diol. The reaction is preferably carried out at a temperature within the range of about −20° to about 80° C. in an organic diluent such as dichloromethane or tetrahydrofuran and in the presence of a base such as pyridine. After substantial completion of the reaction, crystalline product can be recovered, washed and recrystallized if greater purity is desired. The product esters contain reactive aliphatic cyclobutene groups. Such a synthesis process is illustrated in Examples 5, 6 and 7 herein.

The starting dialkylidenecyclobutane monomers can be prepared by the thermal dimerization of the corresponding allene in a recirculating hot-tube reactor. Such a process can be carried out by circulating a stream of gaseous allene through a tube reactor at 450°-600° C. with a residence time in the hot zone of 0.1 to 10 seconds. Downstream from the hot zone, the stream is cooled sufficiently to condense the dialkylidenecyclobutane. Unchanged allene (combined with a fresh makeup stream) is pumped back to the hot zone. Such a process is described for 1,2-dimethylenecyclobutane in Chernykh et al., Neftepererab. Neftekhim., 1981 (7), pp. 48-50. Synthesis of 1,2-dimethylenecyclobutane is also illustrated in Example 1 herein. The allene starting material can be produced by pyrolysis of isobutylene or by isolation from crude refinery propylene streams. The product 1,2-dimethylenecyclobutane can then be reacted with a difunctional or multifunctional dienophile to produce a monomer having two or more cyclobutene functional groups.

Copolymerization Reaction

The bis(aliphatic cyclobutene) and the polydienophilic comonomers can be combined in any manner desired, such as melt, solution or powder blending. The preferred technique involves melting a mixture of the solid monomers containing the desired quantities of each monomer at a temperature above the respective melting points but below the polymerization temperature of either monomer, and stirring the melt until a homogeneous mixture is achieved. The melt may optionally be held at temperatures above about 120° C. for desired periods of time in a process of prepolymerization to increase the crystallization resistance of the melt and/or to increase its viscosity to desired levels. The mixture can then be poured directly into a mold for polymerization, or it can be cooled for later polymerization.

The copolymerization reaction is carried out by subjecting the monomers, or a prepolymer thereof, to an elevated temperature which will depend upon the specific monomers and the processing technique being used. For example, slow polymerization at temperatures below about 150° C. is preferred for fabrication processes involving shaping of partially-cured resin, such as filament winding, for example. Fast polymerization at temperatures above 180° C. is preferred for bulk molding techniques. In general, the polymerization reaction will be carried out at temperatures within the range of about 120° to about 290° C., preferably about 150° to about 270° C., held for a time of about 0.25 hours or more (with the required cure time dependent on the temperature-staging program used and the thickness of the part). The reaction can be performed in the presence or absence of radical inhibitors or radical initiators. For achieving fully-cured properties of the invention polymeric compositions, the monomers can be heated at a temperature near (within about 15° C. below) or above the ultimate, or fully-cured, glass transition temperature of the polymer ($Tg_u$) for a time sufficient to produce essentially complete reaction of the monomers. "Essentially complete" reaction of the monomers has been reached when no further reaction exotherm is observed by differential scanning calorimetry (DSC) upon heating the copolymer. The time of the heat treatment, or "post-cure," will vary depending upon the monomers, the degree of pressure applied and any pre-curing of the monomer mixture at temperatures lower than about ($Tg_u - 15°$ C.). Preferably, this post-cure is at or above the ultimate Tg, most preferably at least 20° C. above $Tg_u$, but will always be lower than the temperature at which degradation of the copolymer will occur.

Suitable dienophilic comonomers include bismaleimides, trismaleimides, diacrylates, triacrylates, bis(-triazolinediones) and unsaturated polyesters containing maleate or fumarate linkages. The preferred dienophilic monomers are bismaleimides because of their commercial availability and the high Tg and toughness achievable in the cured polymers. The relative amounts of the cyclobutene and dienophilic monomers will affect the properties of the cured copolymer. The molar ratio of the cyclobutene to the dienophile is generally within the range of about 0.5 to about 1.8, preferably about 0.8 to about 1.5.

The monomer mixture will optionally but preferably include a free radical inhibitor present in an amount effective to inhibit free radical polymerization of the dienophile. Generally, the free radical inhibitor will be present in the composition in an amount within the range of about 0.0002 to about 0.02 moles per mole of the polydienophile, preferably from about 0.001 to about 0.01 moles. The free radical inhibitor can be added to the monomers in any manner effective for intimate blending therewith, such as melt-blending a mixture of the monomers and free radical inhibitor. The preferred free radical inhibitor, because of the demonstrated toughness of the resulting copolymers, is phenothiazine.

For preparation of reinforced laminate materials, a fibrous substrate of glass, carbon, quartz, poly(p-phenyleneterephthalamide), polyester, polytetrafluoroethylene, poly(p-phenylenebenzobisthiazole), boron, paper or like material, in chopped, mat or woven form, is impregnated with the monomers in molten or solution form. A prepreg is formed by heating the impregnated substrate in an oven at a temperature sufficient to remove any solvent present and to partially cure without gelation, or "B-stage," the resin system, generally about 120° to about 180° C., preferably about 135° to about 175° C., for a time of up to about 2 hours, preferably about 10 to about 40 minutes. A laminate is fabricated by subjecting a set of layered prepregs to conditions effective to cure the resins and to integrate the prepregs into a laminated structure. The laminate can optionally include one or more layers of a conductive material such as copper. Laminating generally involves subjecting the prepregs to a temperature above about 150° C., preferably from about 180° to 290° C., at a pressure within the range of about 50 to about 500 psi.

For some laminating applications, it has been found advantageous to heat treat, or upstage, the monomers prior to application to a laminating substrate, particularly if the mixture will be stored prior to use. Suitable heat treatment involves subjecting the monomers to an elevated temperature for a time effective to cause sufficient reaction and viscosity increase to inhibit crystallization of either or both monomers from the mixture upon storage, but not sufficient to gel the composition. Such heat treatment conditions generally include a temperature of at least about 120° C., preferably about 135° to about 175° C., for a time of at least about 10 minutes, preferably about 12 to about 90 minutes. The resulting mixture will be less tacky and less susceptible to crystallization of the components with storage.

The invention polymeric compositions are useful as the resinous component of encapsulation, adhesive and coating formulations, and as matrix resins for high-temperature composites with glass, graphite or other fibers. Fabrication of such composites can be carried out by prepreg techniques, filament winding, pultrusion and resin transfer molding, for example. The composites are useful in aerospace, sporting goods, automotive and electronics applications.

EXAMPLE 1

Preparation of 1,2-Dimethylenecyclobutane

A recirculating apparatus for the thermal dimerization of allene was designed as follows. The heated reactor was a bank of approximately 110 segments (each about 30 cm long) of stainless steel tubing 1.27 cm in outside diameter. The segments were arranged vertically in series and connected to one another by U-shaped stainless steel connectors to which they were welded. The volume of the heated portion of the reactor was about 3.4 liters. The bank of tubes was immersed in a fluidized bed of aluminum oxide particles. Thermocouples wedged between the connectors of the reactor at various points allowed one to monitor the wall temperature of different segments of the reactor.

Downstream from the reactor was a cold trap containing a cooling fluid at approximately −65° C. above a flask which functioned as a gas-liquid separator. Downstream from the first trap was a second trap filled with dry ice in dichloromethane, guarding the outlet to the system (through an oil bubbler) to condense any allene which otherwise could have escaped from the system. Condensed allene from this second trap fell into the gas-liquid separator. The condensed material (allene dimers and some of the allene) from the traps fell to the bottom of the separator and then flowed through a fluoropolymer tube into a reservoir for liquid allene and allene dimers. Sufficient heat was applied to this reservoir to keep the allene boiling gently. The allene not condensed by the cold traps was combined with that evaporating from the reservoir. This stream of recovered allene was passed through a filter into a diaphragm pump which recirculated the allene back into the hot tube. A makeup stream of fresh allene from a cylinder was also introduced into the loop just upstream from the recirculation pump.

The system was first purged with nitrogen. The power to the fluidized bed was turned on and its temperature was brought to 450°–470° C. Allene was introduced into the system from the allene cylinder at a rate of 80–100 g/hr. The allene supply from the cylinder was shut off two to three hours before the end of a dimerization run in order that the allene present in the system could be used up, with little allene remaining in the reservoir at the end. At the end of the day, the power to the fluidized bed was turned off, the system was allowed to cool, and the accumulated dimer was poured into a bottle and weighed. Approximately 3 g of phenothiazine was added per kilogram of dimer to inhibit polymerization of the 1,2-dimethylenecyclobutane. The crude dimer was then analyzed by gas chromatography for peaks corresponding to two allene dimers, 1,2-dimethylenecyclobutane (1,2-DMCB) and 1,3-dimethylenecyclobutane (1,3-DMCB), and a component shown by mass spectrometry to have a molecular formula of $C_9H_{12}$ (an allene trimer). Data from seven hot tube reaction runs are shown in Table 1.

of Technochemie), 9.88 g (0.10 moles of 1,2-isomer) of 1,2-dimethylenecyclobutane, 0.0536 g phenothiazine and 60 g dichloromethane. The mixture started as a suspension but became homogeneous as it was stirred at room temperature over about 2½ hours. Slightly over one hour after the solution became homogeneous, however, a precipitate began to form again. Stirring was continued overnight at room temperature and then for 5 hours at gentle reflux. The crystals were filtered off and washed with a small amount of additional dichloromethane. The first crop of crystals weighed 6.05 g and melted at 154°–156° C. Concentration of the filtrate yielded a second crop of crystals (10.46 g) melting at 155°–158° C. The $^{13}C$ NMR spectrum of the product was consistent with the following structure:

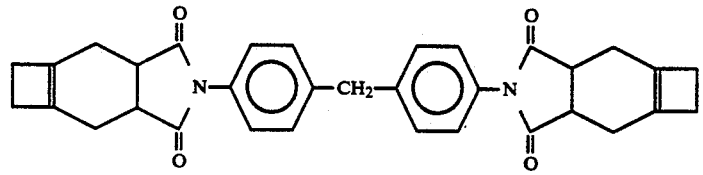

EXAMPLE 3

Preparation of a Bis(aliphatic cyclobutene)-Functional Monomer from 1,4-Benzoquinone Into a 50-mL, single-neck round bottom glass flask were weighed 4.32 g (0.04 moles) of 1,4-benzoquinone, 8.63 g (0.09 moles of 1,2-isomer) of 1,2-dimethylenecyclobutane and 15 g of 1,1,1-trichloroethane. The mixture was gently refluxed with magnetic stirring. A precipitate began to separate after about 7 hours of refluxing. Reflux was continued overnight with stirring. After approximately 21 hours, the reaction mixture was allowed to cool and additional crystals separated. The crystals were filtered off, washed with a small amount of additional 1,1,1-trichloroethane, and dried under vacuum. The dried crystals weighed 8.82 g but contained predominantly the monoadduct of 1,2-dimethylenecyclobutane with benzoquinone. Recrystallization from isopropyl alcohol (10 g per gram of crystals) yielded 1.76 g of the purified diadduct. It did not melt

TABLE 1

| Reaction # | Reaction time, hr. | Allene used, g | Crude dimer produced, g | Crude yield, % | GC analysis | | | 
|---|---|---|---|---|---|---|---|
| | | | | | 1,3-DMCB, % | 1,2-DMCB, % | $C_9H_{12}$ peak, % |
| 1 | 8.0 | 558 | 443 | 79.4 | 8.4 | 67.0 | 15.0 |
| 2 | 15.8 | 1197 | 881 | 73.6 | 8.1 | 75.0 | 11.0 |
| 3 | 11.3 | 862 | 753 | 87.3 | 8.3 | 73.4 | 11.4 |
| 4 | 11.2 | 824 | 647 | 78.5 | 8.3 | 71.6 | 14.0 |
| 5 | 11.8 | 932 | 806 | 86.5 | 8.5 | 68.7 | 15.4 |
| 6 | 11.4 | 909 | 746 | 82.1 | 8.4 | 68.0 | 16.2 |
| 7 | 11.0 | 872 | 724 | 83.0 | 8.5 | 69.0 | 15.7 |

The products of the seven runs in Table 1 were flash-distilled under vacuum to remove tars and were subsequently distilled under reduced pressure in 2.54 cm Oldershaw columns with 30 plates. The resulting distilled fractions and similarly-obtained DMCB cuts were used in the following examples.

EXAMPLE 2

Preparation of a Bis(aliphatic cyclobutene)-functional Monomer from a Bismaleimide Into a 100-mL, single-neck round bottom glass flask were weighed 17.92 g (0.05 moles) of bis(4-maleimidophenyl)methane (COMPIMIDE® MDAB, a product below 300° C. but sintered and appeared to polymerize above 260° C. The $^{13}C$ NMR spectrum of the product was consistent with the structure shown below. The mass spectrum showed the expected parent peak at m/e=268.

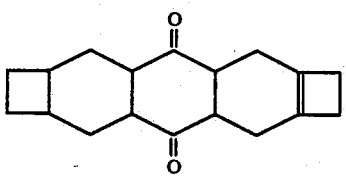

EXAMPLE 4

Preparation of bicyclo[4.2.0]-oct-1(6)ene-3-carbonyl Chloride (BOCC)

A 250-mL, 4-neck round bottom flask was fitted with a magnetic stirring bar, a thermometer, a 50-mL addition funnel and an air condenser. (All glassware was dried for at least one hour at 140° C. before use.) To the flask were added 50.44 g of a distilled dimethylenecyclobutane (DMCB) cut containing 82.6% (by GC) 1,2-isomer (41.67 g, or 0.52 moles, of 1,2-dimethylenecyclobutane) and 0.2 g of phenothiazine. To the addition funnel were added 45.26 g (0.50 moles) of acryloyl chloride. The flask and addition funnel were then purged with dry nitrogen. The acryloyl chloride was added to the DMCB dropwise with stirring at room temperature. After most of the acryloyl chloride had been added, the exotherm from the Diels-Alder reaction raised the temperature to 66° C. Application of ice-water bath cooling then brought the temperature back to room temperature. The reaction mixture was allowed to stand for three weeks at room temperature. The product was then distilled at a head temperature of 59°-63° C. at a pressure of 40 Pa. Product yield (in two distillation cuts, after removal of unreacted starting material and inerts) was 75.7 g (87%).

EXAMPLE 5

Preparation of a Bis(aliphatic cyclobutene) Diester from the Product of Example 4.

A 500-mL, 4-neck round bottom flask was fitted with a magnetic stirring bar, a thermometer, a 50-mL addition funnel and an air condenser. (All glassware was dried for at least one hour at 140° C. before use.) To the flask were added 4.95 g (0.045 moles) of resorcinol, 8.70 g (0.11 moles) of pyridine and 150 g of dry dichloromethane. To the addition funnel were added 17.06 g (0.10 moles) of distilled BOCC from Example 4 and 20 grams of dry dichloromethane. The glassware was purged with dry nitrogen and the flask was cooled to 5°-7° C. with an ice-water bath. The material from the addition funnel was added dropwise over a period of about 10 minutes, with the liquid temperature in the flask kept at or below 10° C. After addition was complete, the mixture was allowed to warm to room temperature and stirred at room temperature overnight.

Approximately 0.05 g of phenothiazine was then added to the mixture as an antioxidant. The mixture was then washed successively with 200 g of water, 200 g of 5% aqueous sulfuric acid, 200 g of 5% aqueous sodium bicarbonate and finally with 200 g of water. The organic layer was then dried by passing it through a small filter funnel filled with anhydrous sodium sulfate. The dichloromethane was then removed with a rotary evaporator. The residue (18 g) was then recrystallized from 90 g of methanol. The first crop (13.75 g, 81%) melted at 69°-72° C. Its $^1$H and $^{13}$C NMR spectra were consistent with the structure below. A second crop of crystals (0.75 g), obtained by cooling the methanol solution, melted at 60°-65° C.

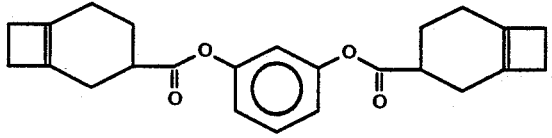

EXAMPLE 6

Preparation of a Bis(aliphatic cyclobutene) Diester

A diester monomer was prepared by the method described in Example 5, except that 10.27 g (0.045 moles) of bisphenol-A was substituted for the resorcinol. The dichloromethane solution was washed and dried as above and then the solvent was removed with a rotary evaporator. The residue (24.4 g) was recrystallized from 120 g of isopropyl alcohol. Yield of recrystallized material was 16.8 g (75%); m.p.=76°-78° C. The $^1$H and $^{13}$C NMR spectra were consistent with the following structure.

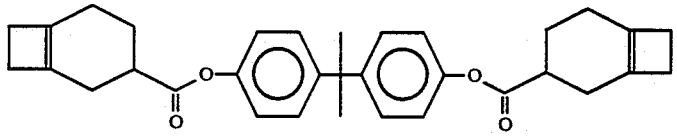

EXAMPLE 7

Preparation of a Bis(aliphatic cyclobutene) Diester Monomer from 2.4-hexadiyne-1.6-diol The monomer was prepared by the procedure described in Example 5 except that 7.71 g (0.07 moles) of 2,4-hexadiyne-1,6-diol were substituted for the resorcinol. To the flask were added 13.45 g (0.17 moles) of dry pyridine and 150 g of dry dichloromethane. To the addition funnel were added 25.60 g (0.15 mole) of distilled bicyclo[4.2.0]oct-1(6)-ene-3-carbonyl chloride and 10 g of dry dichloromethane. Reaction and workup were conducted as in Example 5. The dichloromethane solution was washed and dried as in Example 5 and then the solvent was removed with a rotary evaporator. The residue (25.8 g) was then recrystallized from 120 grams of methanol. Yield of recrystallized material was 20.5 g (77%); m.p.=69°-72° C. The $^1$H and $^{13}$C NMR NMR spectra were consistent with the following structure.

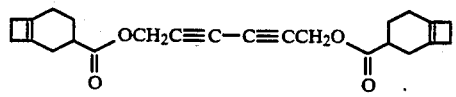

EXAMPLE 8

Copolymerization of a Bis(aliphatic cyclobutene)-functional Monomer with a Bismaleimide The second crop of crystals from Example 2 (1.5037 g) was mixed in a small glass beaker with 1.0378 g of bis(4-maleimidophenyl)methane (COMPIMIDE® MDAB resin) and 0.0065 g phenothiazine. The beaker was placed into an oil bath at 170° C. to melt the mixture. The melted mixture was then poured into a mold formed of 3"×3" glass plates separated by a 1/16" diameter polytetrafluoroethylene spacer. The mold was then placed in an oven and the mixture was cured for one hour at 180° C., one hour at 210° C., 30 minutes at 230° C., 30 minutes at 250° C., 30 minutes at 270° C. and one hour at 290° C. The resultant casting had a dynamic mechanical Tg of 279° C. and was extremely tough to scissor peel (a sliver could be cut from the casting very easily with a pair of scissors).

EXAMPLE 9

Copolymerization of a Bis(aliphatic cyclobutene) Diester with a Diacrylate

The recrystallized product of Example 6 (4.0003 g, 0.00805 moles) was mixed in a 25-mL filtering flask with 1.7103 g (0.00806 moles) of the diacrylate of 2,2-dimethyl-1,3-propanediol, 0.0118 g of phenothiazine and 0.0111 g of Monsanto PC-1344. The flask was placed in an oil bath at 120° C. and the resin was melted and degassed for approximately 5 minutes at a pressure of approximately 80 Pa. The degassed resin was then poured into a two-piece rectangular stainless steel mold preheated to 120° C. and having a 1/16" thick cavity, with mold parts separated by a gastight silicone rubber gasket such that the mold could be pressurized during cure. The mold was then placed in an oven and pressurized with nitrogen to 750 kPa. The resin was cured for one hour at 120° C., followed by ramping linearly to 260° C. over a period of 3.5 hours and then holding for one hour at 260° C. The resultant casting was translucent, had a dynamic mechanical loss modulus peak at 75° C. and was very tough to scissor peel (a sliver could be cut from the casting very easily with a pair of scissors). The compact tension fracture toughness Kq (ASTM-E 399-83) of the casting was 1.30 MPa-m$^{\frac{1}{2}}$.

EXAMPLE 10

Copolymerization of Bis(aliphatic cyclobutene) Diesters with a Bismaleimide

The products of Examples 5, 6 and 8 (or the same materials prepared in scaled-up experiments) were mixed, in Erlenmeyer flasks with a sidearm vacuum connection, with bis(4-maleimidophenyl)methane (COMPIMIDE® MDAB), phenothiazine and Monsanto PC-1344 antifoaming agent. Each flask was placed in an oil bath at approximately 120° C. and the resin mixture was melted and degassed for 5 to 15 minutes at a pressure of about 50 Pa. The degassed resin mixture was then poured into the preheated mold described in Example 9. The mold was placed in an oven and pressurized with nitrogen to 750 kPa (~95 psig). The resin was cured for 1 hour at 120° C., followed by ramping linearly to 260° C. over 3.5 hours and then holding for 1 hour at 260° C. Physical properties of the cured resin castings are shown in Table 2.

TABLE 2

| Experiment # | 1 | 2 | 3 |
|---|---|---|---|
| Composition: | | | |
| Monomer, grams | 6.97 | 6.16 | 6.16 |
| moles | 0.0140 | 0.0163 | 0.0163 |
| Monomer preparation shown in example # | 6 | 5 | 8 |
| 4,4'-Bismaleimidodiphenyl-methane, grams | 5.03 | 5.83 | 5.83 |
| moles | 0.0140 | 0.0163 | 0.0163 |
| Phenothiazine, grams | 0.0328 | 0.0305 | 0.03 |
| Monsanto PC-1344 defoamer, grams | 0.0362 | 0.0391 | 0.03 |
| Cured properties: | | | |
| Rheometrics tan δ peak, °C. | 214 | 183 | 344 |
| R.T. dry flexural (ASTM D-790): | | | |
| Yield Strength, MPa | 124 | 47$^a$ | 73$^a$ |
| Tangent modulus, GPa | 2.65 | 3.15 | 3.26 |
| Break elongation, % | >6.5 | 1.5 | 2.4 |
| 93° C. wet flexural (ASTM D-790) | | | |
| Yield Strength, MPa | 10 | | 47$^a$ |
| Tangent modulus, GPa | 2.25 | | 2.75 |
| Break elongation, % | 0.5 | | 1.8 |
| Compact tension fracture toughness, K$_q$, MPa-m$^{\frac{1}{2}}$ (ASTM E 399-83) | 2.29 | 0.88 ± 0.38$^b$ | |
| 93° C. H$_2$O pickup, %: | | | |
| 1 day | 0.86 | | 1.63 |
| 2 weeks | 1.12 | disint. | 2.29 |
| Room temp. methyl ethyl ketone pickup, %: | | | |
| 1 day | 46.9 | 24.4 | 0 |
| 2 weeks | 49.4 | 94.5 | 0 |
| Room temp. CH$_2$Cl$_2$ pickup, %: | | | |
| 1 day | 1080 | disint. | 1.23 |
| 2 weeks | disint. | | disint. |

$^a$Break strength.
$^b$Different areas of the casting appeared to be different in toughness (as determined by ability to cut off a coherent sliver with a pair of scissors).

EXAMPLE 11

Copolymerization of a Bismaleimide Bisdienophile with 1,2-Dimethylenecyclobutane and a Bis(aliphatic cyclobutene) Diester Monomer Three mixtures were prepared as follows. To 500-mL glass bottles were added COMPIMIDE® MDAB (bismaleimide of 4,4'-methylenedianiline), a distilled dimethylenecyclobutane fraction containing mostly 1,2-isomer, phenothiazine and Monsanto PC-1344 defoamer along with 180 g dichloromethane solvent. The bottles were placed on rollers and rolled overnight (or longer) at room temperature to allow completion of the first-stage Diels-Alder reaction between the 1,2-dimethylenecyclobutane and the maleimide groups of the bismaleimide. The diester of bisphenol-A with bicyclo[4.2.0]oct-1(6)-ene-3-carboxylic acid (product of Example 6) was then added to each mixture and dissolved. The mixtures were then poured into 250-mL Erlenmeyer flasks with a vacuum connection. The flasks were then placed into a 125°-150° C. oil bath and the contents were swirled as solvent, 1,3-dimethylenecyclobutane and other volatile unreacted molecules were removed, first at atmospheric pressure and then under mechanical pump vacuum for a few minutes until bubbling had essentially stopped. The degassed molten mixtures were then poured into a two-piece rectangular stainless steel mold with a ⅛" thick cavity, with the mold parts separated by a gastight silicone rubber gasket such that the mold could be pressurized during cure. A few grams of each uncured sample were kept as a retain for characterization of uncured properties. The mold was placed into an oven and pressurized with nitrogen to 750 kPa (~95 psig) and the systems were cured according to the cure schedules shown in Table 3. Properties of the castings and uncured systems are shown in Table 3.

As can be seen from the test results, incorporation of the diester into the BMI-DMCB composition lowers the temperature at which a desirable fiber impregnation viscosity of 1 Pa·s is reached. This temperature is lowered in line with the percentage of diester incorporated into the system. Losses of Tg and toughness as a result of diester incorporation are of a degree at which the systems remain acceptable for many uses.

TABLE 3

| Experiment # | 1 (control) | 2 | 3 |
|---|---|---|---|
| Composition: | | | |
| COMPIMIDE ® MDAB, grams | 73.10 | 53.75 | 53.75 |
| moles | 0.2040 | 0.1500 | 0.1500 |
| 1,2-Dimethylenecyclobutene (DMCB): | | | |
| Crude distillate, grams | 19.78 | 10.30 | 10.30 |
| % 1,2-isomer in crude distillate (GC area) | 82.606 | 93.363 | 93.363 |
| Net 1,2-isomer, grams | 16.34 | 9.62 | 9.62 |
| moles | 0.2039 | 0.1200 | 0.1200 |
| Phenothiazine, grams | 0.21 | 0.17 | 0.17 |
| Monsanto PC-1344 defoamer, grams | 0.24 | 0.19 | 0.19 |
| Product of Example 6, grams | | 14.90 | 29.80 |
| moles | | 0.0300 | 0.0600 |
| Cure schedule[a] | A | B | B |
| Uncured properties: Temperature, °C., at which viscosity reaches 1 Pa.s on heatup | 125 | 109 | 102 |
| Cured properties: Rheometrics tan δ peak, °C. | 291 | 254 | 239 |
| R.T. dry flexural (ASTM D-790): | | | |
| Yield Strength, MPa | 122 ± 1 | 122 ± 1 | 110 ± 8 |
| Tangent modulus, GPa | 2.67 ± 0.02 | 2.63 ± 0.01 | 2.55 ± 0.03 |
| Break elongation, % | >6.5 | >6.5 | >5.5 |
| 93° C. wet flexural (ASTM D-790): | | | |
| Yield Strength, MPa | 81 ± 1 | 52 ± 7[b] | 20 ± 1[b] |
| Tangent modulus, GPa | 2.33 ± 0.02 | 2.41 ± 0.02 | 2.43 ± 0.03 |
| Break elongation, % | >6.5 | 2.4 ± 0.5 | 0.9 ± 0.1 |
| Compact tension fracture toughness, $K_q$, MPa-m$^{\frac{1}{2}}$ (ASTM E 399-83) | 2.93 ± 0.13 | 1.96 ± 0.18 | 1.84 ± 0.15 |
| Dielectric constant, 1 MHz (ASTM D229/15) | 3.40 | 3.20 | 3.21 |
| Dissipation factor, 1 MHz (ASTM D229/15) | 0.0156 | 0.0126 | 0.0135 |
| 93° C. H$_2$O pickup, %: | | | |
| 1 day | 1.66 | 2.12 | 1.41 |
| 2 weeks | 2.28 | 2.84 | 2.07 |
| Room temp. methyl ethyl ketone pickup, %: | | | |
| 1 day | 0 | 0.48 | 2.99 |
| 2 weeks | 1.69 | 6.70 | 30.1 |
| Room temp. CH$_2$Cl$_2$ pickup, %: | | | |
| 1 day | 169 | disint. | disint. |
| 2 weeks | 179 | | |

[a]Cure schedules:
A = 1 hour at 120° C., then linear ramp to 260° C. over 3.5 hours and then 1 hour hold at 260° C.
B = 1 hour at 120° C., then linear ramp to 220° C. over 2.5 hours and then 1 hour hold at 220° C.
[b]Break strength.

I claim:
1. A composition comprising:

(a) a cyclobutene compound of the structural formula

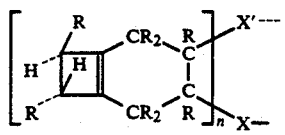

in which each R is selected independently from hydrogen, halide, C$_{1-10}$ alkyl, aryl and C$_{1-10}$ heteroatomic; X is a divalent linking group; X' is selected independently from R and divalent linking groups; n is 2; and (b) a compound containing at least 2 dienophilic groups per molecule.

2. The composition of claim 1 in which component (b) is selected from at least one of the groups consisting of bismaleimides, trismaleimides, diacrylates, triacrylates, bis(triazolinediones) and unsaturated polyesters containing maleate or fumarate linkages.

3. The composition of claim 1 in which component (4) is described by the structural formula

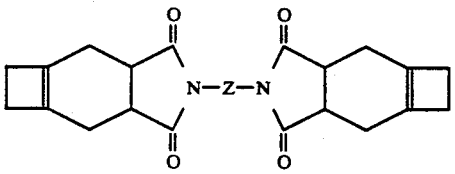

in which Z is a divalent linking moiety.

4. The composition of claim 1 in which component (a) can be described by the structural formula

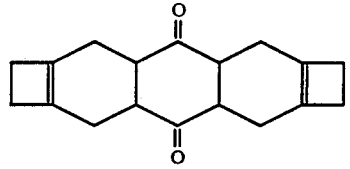

5. The composition of claim 1 in which component (b) is a bismaleimide.

6. The composition of claim 1 which further comprises (c) a free radical inhibitor.

7. The composition of claim 6 in which the free radical inhibitor is phenothiazine.

8. The composition of claim 1 in which components (a) and (b) are present in the composition in a molar ratio a:b within the range of about 0.5:1 to about 1.8:1.

9. The composition of claim 1 which further comprises a fibrous reinforcing agent.

10. A -process comprising: (a) providing a monomeric mixture comprising (i) at least one monomer of the structural formula

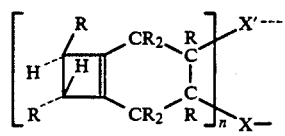

in which each R is selected independently from hydrogen, halide, C$_{1-10}$ alkyl, aryl and C$_{1-10}$ heteroatomic; X is a divalent linking group; X' is selected independently from R and divalent linking groups; and n is 2; and (ii) a monomer containing at least 2 dienophilic moieties per molecule; and (b) exposing said monomeric mixture to an elevated temperature for a time sufficient to increase the average molecular weight of said monomers.

11. The process of claim 10 in which monomer (i) is described by the structural formula

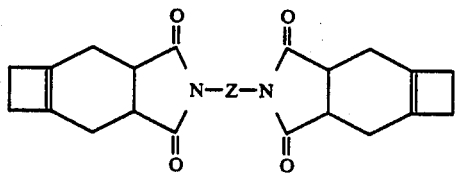

in which Z is a divalent linking moiety.

12. The process of claim 10 in which Z is

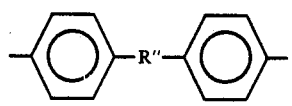

in which R'' is selected from a direct bond, $C_{1-10}$ alkylidene, oxygen and sulfur.

13. The process of claim 10 in which the monomeric mixture further comprises 1,2-dimethylenecyclobutane.

14. The process of claim 10 in which the monomer (i) is described by the structural formula

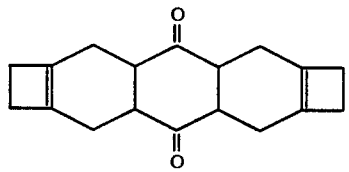

15. A process comprising exposing a monomer mixture comprising a bismaleimide and at least one monomer of the formula

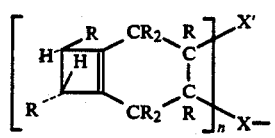

in which R is selected independently from hydrogen, halide, $C_{1-10}$ alkyl, aryl and $C_{1-10}$ heteroatomic; X is a divalent linking group; X' is selected independently from R and divalent linking groups; and n is 2, to a temperature of at least about 120° C. for a time sufficient to increase the average molecular weight of the constituents of said monomer mixture.

16. The process of claim 15 in which the temperature of exposure is within the range of about 135° to about 175° C.

17. The process of claim 15 in which the time of exposure to said elevated temperature is at least about 0.25 hour.

18. The process of claim 17 in which the temperature of exposure over at least a portion of said time of exposure is at least ($Tg_u$-15° C.), in which $Tg_u$ is the ultimate glass transition temperature of said at least one monomer in its fully-cured state.

19. The process of claim 15 in which the monomeric mixture comprises at least one monomer of the structural formula

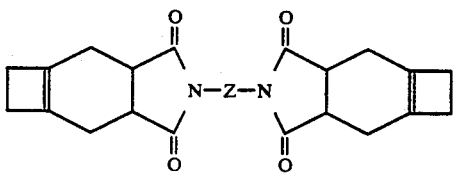

in which Z is a divalent linking moiety.

20. The process of claim 15 in which the bismaleimide comprises 4,4'-bismaleimidodiphenylmethane.

* * * * *